(12) United States Patent
van Arendonk et al.

(10) Patent No.: US 8,614,421 B2
(45) Date of Patent: Dec. 24, 2013

(54) METHOD AND SYSTEM FOR ASSEMBLY OF GLASS SUBSTRATE-BASED RADIOLOGICAL IMAGING SENSOR

(75) Inventors: Anton van Arendonk, Waterloo (CA); Andrey Lomako, Waterloo (CA); Weidong Tang, Kitchener (CA); Brian Benwell, Waterloo (CA)

(73) Assignee: Teledyne DALSA Inc., Waterloo (CA)

( * ) Notice: Subject to any disclaimer, the term of this patent is extended or adjusted under 35 U.S.C. 154(b) by 107 days.

(21) Appl. No.: 13/413,114

(22) Filed: Mar. 6, 2012

(65) Prior Publication Data
US 2012/0228512 A1 Sep. 13, 2012

Related U.S. Application Data

(60) Provisional application No. 61/449,799, filed on Mar. 7, 2011.

(51) Int. Cl.
*G01T 1/20* (2006.01)
(52) U.S. Cl.
USPC ........................................................ 250/368
(58) Field of Classification Search
USPC ................ 250/368, 370.01–370.15; 378/98.8
See application file for complete search history.

(56) References Cited

U.S. PATENT DOCUMENTS

| | | | | |
|---|---|---|---|---|
| 4,645,618 | A * | 2/1987 | Lee et al. | 252/301.17 |
| 6,479,827 | B1 * | 11/2002 | Hamamoto et al. | 250/370.11 |
| 7,019,301 | B2 * | 3/2006 | Homme et al. | 250/370.11 |
| 2002/0038851 | A1 * | 4/2002 | Kajiwara et al. | 250/368 |
| 2003/0161944 | A1 * | 8/2003 | Barksdale et al. | 427/157 |
| 2004/0252955 | A1 * | 12/2004 | Kajiwara et al. | 385/120 |
| 2007/0138409 | A1 * | 6/2007 | Daniel | 250/483.1 |
| 2010/0108893 | A1 * | 5/2010 | Flitsch et al. | 250/361 R |
| 2011/0180890 | A1 * | 7/2011 | Sato | 257/429 |
| 2012/0001282 | A1 * | 1/2012 | Goto et al. | 257/429 |

* cited by examiner

*Primary Examiner* — Kiho Kim
(74) *Attorney, Agent, or Firm* — Aaron Edgar; Gowling Lafleur Henderson LLP

(57) ABSTRACT

A method and system of constructing and assembling a radiological imaging sensor having a transparent crystalline substrate plate, such as a glass or sapphire plate, for use in assembling the radiological imaging sensor using either a clear fiber optic plate of a dark fiber optic plate with ultraviolet curable adhesives. The transparent glass substrate plate may further include at least one crystalline sapphire strip disposed in an aperture therewithin. Flexible cable connections are provided by wire bonding to the imaging die substrate.

20 Claims, 5 Drawing Sheets

METHOD AND SYSTEM FOR ASSEMBLY OF GLASS SUBSTRATE-BASED RADIOLOGICAL IMAGING SENSOR

CROSS-REFERENCE TO RELATED APPLICATION

This application claims the benefit of and priority to U.S. Provisional Patent Application Ser. No. 61/449,799 filed Mar. 7, 2011, the entire disclosure of which is incorporated herein by reference.

FIELD OF THE INVENTION

The present invention relates generally to processes and materials for assembly of radiological imaging sensors, such as for medical imaging.

BACKGROUND OF THE INVENTION

A radiological imaging sensor typically comprises a semiconductor chip having an array of photosensitive pixels, each pixel including a photodetector and an active amplifier, a scintillator covering the chip and a fiber optic plate positioned between the scintillator and the semiconductor chip. The scintillator layer converts incoming X-rays into visible light. The above-described elements of the radiological imaging sensor may be contained in a package from which a connection cable may extend to a computer system for processing acquired images.

FIG. 1 is a cross sectional view of a prior art radiological imaging sensor 100 having Kovar substrate 101 and based on a thermal-cured adhesive process. Imaging die 104 having an active sensor area 105 is stacked on top of Kovar substrate 101, and is secured in place thereon by a thermally cured adhesive layer 103. Similarly, fiber optic plate 106 is stacked on imaging die 104, and is secured in place using thermally cured adhesive layer 110. It is noted that the thermal cure process is very batch oriented, and also very time-consuming, in the order of 12 to 18 hours per cycle typically. It is evident that typically 2 thermal cure cycles may be required in assembling imaging sensor 100. Scintillator layer 107 may be either a deposited layer, or else may be applied as a paper strip, secured appropriately in place using a press-on cover. Kovar substrate 101, more expensive than a clear glass substrate typically by a factor of around 100 times, is typically selected to minimize thermal mismatch effects generated during the thermal cycles for adhesive thermal curing in assembly and construction of radiological imaging sensor 100.

Those skilled in the art will appreciate that a special bonding post 108 must be provided in order to form wire bond connection 109 for any flexible cable connections to imaging sensor 100.

SUMMARY OF THE INVENTION

Provided is a method of assembling a radiological imaging sensor. The method comprises providing a transparent crystalline substrate plate having an upper side and a bottom side; applying a first layer of ultra-violet curable adhesive to the upper side of the transparent crystalline substrate plate; placing an imaging die on top of the first layer of ultra-violet curable adhesive, the imaging die having an active image sensor region located at a top surface of the imaging die; curing the first layer of ultra-violet curable adhesive by exposure to ultra-violet radiation, the ultra-violet radiation applied through the bottom side of the transparent transparent crystalline substrate plate; providing at least one flexible cable connection by forming a wire bond from the flexible cable to the imaging die; applying a second layer of ultra-violet curable adhesive to the top surface of the imaging die, the second layer covering at least the active image sensor region; stacking a clear fiber optic plate on the top surface of the imaging die, the clear fiber optic plate covering at least the image sensor region; curing the second layer of ultra-violet curable adhesive by exposure to ultra-violet radiation, the ultra-violet radiation applied through a top side of the stacked clear fiber optic plate and providing a scintillator layer on a top surface of the clear fiber optic plate.

In an embodiment, the scintillator layer is provided by deposition on the top surface of the clear fiber optic plate.

The scintillator layer may comprises a paper strip of scintillator material in an alternate embodiment. The paper scintillator strip may be attached onto the radiological imaging sensor by a press-on cover.

In one embodiment, the crystalline substrate plate is one of a glass substrate plate and a sapphire substrate plate.

In another embodiment, the crystalline substrate plate comprises a transparent glass substrate plate, the transparent glass substrate plate further including at least one crystalline sapphire strip disposed in an aperture therewithin.

The imaging die, in an embodiment, is one of a charge couple device (CCD) imaging sensor and a complementary metal oxide semiconductor (CMOS) imaging sensor.

Also provided is a method of assembling a radiological imaging sensor. The method comprises providing a transparent glass substrate plate having an upper side and a bottom side; applying a first layer of ultra-violet curable adhesive to the upper side of the glass substrate plate; placing an imaging die on top of the first layer of ultra-violet curable adhesive, the imaging die having an active image sensor region located at a top surface of the imaging die; curing the first layer of ultra-violet curable adhesive by exposure to ultra-violet radiation, the ultra-violet radiation applied through the bottom side of the transparent glass substrate layer; providing at least one flexible cable connection by forming a wire bond from the flexible cable to the imaging die; applying a second layer of ultra-violet curable adhesive to the top surface of the imaging die, the second layer covering at least the active image sensor region, and stacking a dark fiber optic plate on the top surface of the imaging die, a top surface of the dark fiber optic plate having a coating of scintillator material, the dark fiber optic plate further being secured in place by support protrusions applied around a perimeter of the dark fiber optic plate.

In an embodiment, the method further comprises exposing the scintillator layer to incident x-rays, wherein scintilator emissions cure the second layer of ultra-violet curable adhesive, thereby bonding the dark fiber optic plate onto the imaging die.

In one embodiment, the imaging die is one of a charge couple device (CCD) imaging sensor and a complementary metal oxide semiconductor (CMOS) imaging sensor.

Also provided is a radiological imaging sensor comprising a transparent glass substrate plate having an upper side and a bottom side; an imaging die disposed on top of the first layer of ultra-violet curable adhesive, the imaging die having an active image sensor region located at a top surface of the imaging die, the imaging die secured in place by a first layer of ultra-violet curable adhesive applied to the upper side of the glass substrate plate; at least one flexible cable connection provided by forming a wire bond from the flexible cable to the imaging die; a clear fiber optic plate stacked on the top surface of the imaging die, the clear fiber optic plate covering at least the image sensor region, the clear fiber optic plate secured in place by a second layer of ultra-violet curable adhesive applied to the top surface of the imaging die; and a scintillator layer disposed on a top surface of the clear fiber optic plate.

In an embodiment, the scintillator layer is provided by deposition on the top surface of the clear fiber optic plate.

In another embodiment, the scintillator layer comprises a paper strip of scintillator material. Further, the paper scintillator strip may be secured onto the radiological imaging sensor using a press-on cover.

In yet another embodiment, the imaging die comprises a charge couple device (CCD) imaging sensor.

In an alternate embodiment, the imaging die comprises a complementary metal oxide semiconductor (CMOS) imaging sensor.

Also provided is a radiological imaging sensor comprising a transparent glass substrate plate having an upper side and a bottom side; an imaging die stacked on top of the glass plate substrate, the imaging die secured in place by a first layer of ultra-violet curable adhesive, the imaging die having an active image sensor region located at a top surface of the imaging die; at least one flexible cable connection provided by forming a wire bond from the flexible cable to the imaging die; a dark fiber optic plate stacked on the top surface of the imaging die, the dark fiber optic plate being secured in place by support protrusions applied around a perimeter of the dark fiber optic plate; a second layer of ultra-violet curable adhesive applied between the top surface of the imaging die and a bottom surface of the dark fiber optic plate; and a scintillator layer deposited on a top surface of the dark fiber optic plate, the scintillator layer disposed over at least the active image sensor region of the imaging die.

In one embodiment, the imaging die comprises a charge couple device (CCD) imaging sensor.

In another embodiment, the imaging die comprises a complementary metal oxide semiconductor (CMOS) imaging sensor.

BRIEF DESCRIPTION OF THE DRAWINGS

The invention will now be described by way of example only with reference to the following drawings in which.

DETAILED DESCRIPTION

Figure 1:
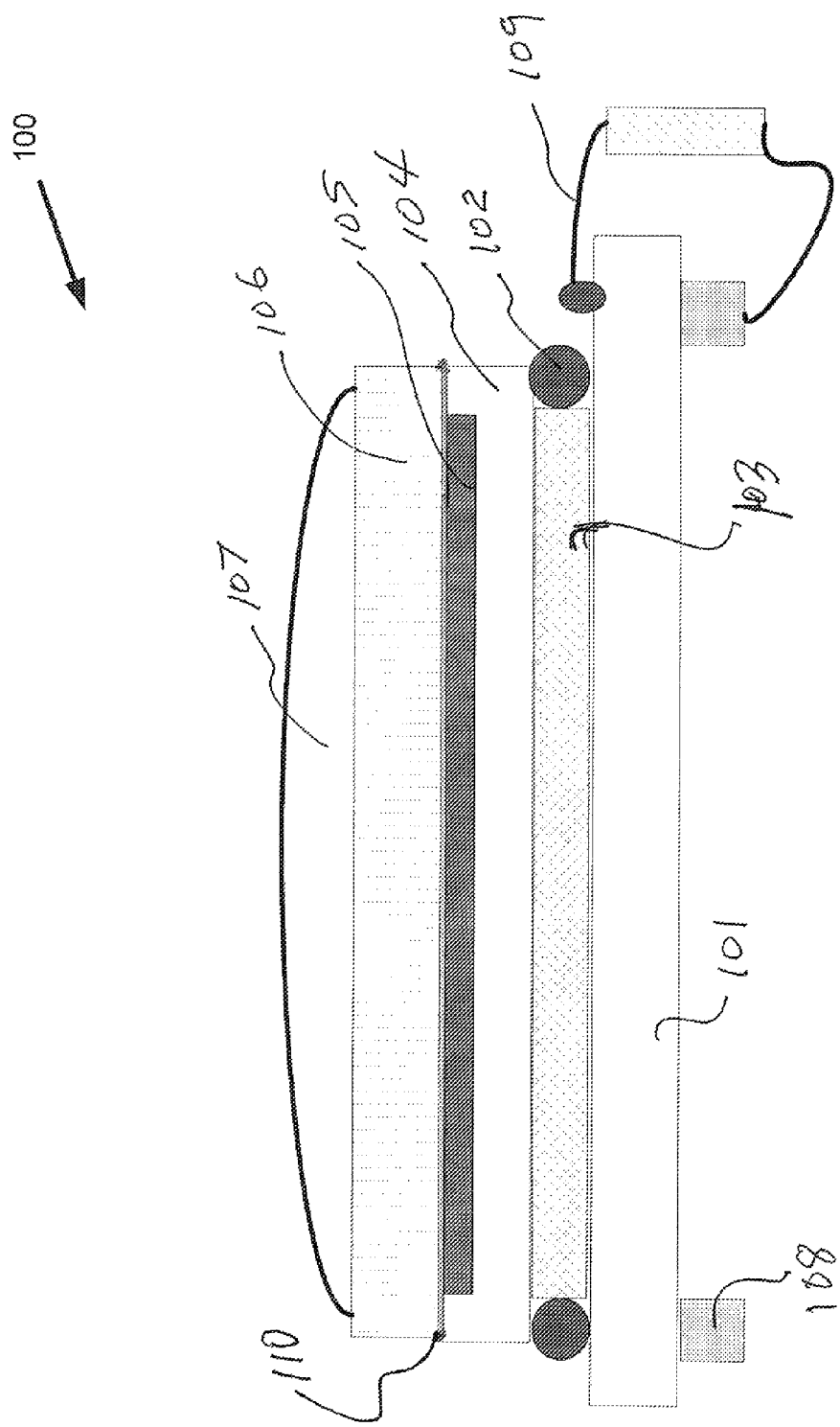
FIG. 1 is a cross sectional view of a prior art radiological imaging sensor having a Kovar substrate and based on a thermal-cured adhesive process.
Figure 2:
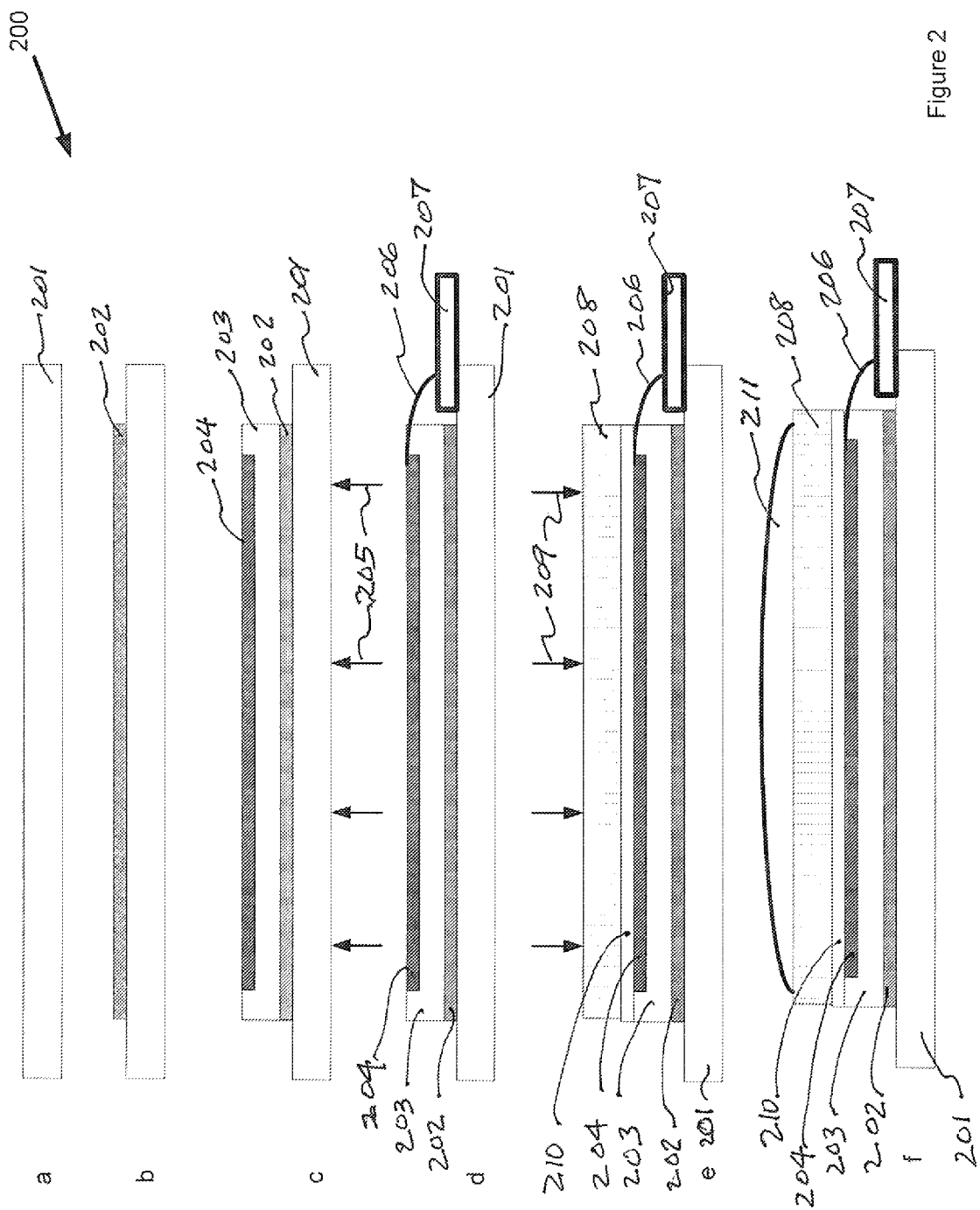
FIGS. 2a to f show one embodiment of a glass substrate based, ultra-violet adhesive curing process using a clear fiber optic plate.
Figure 3:
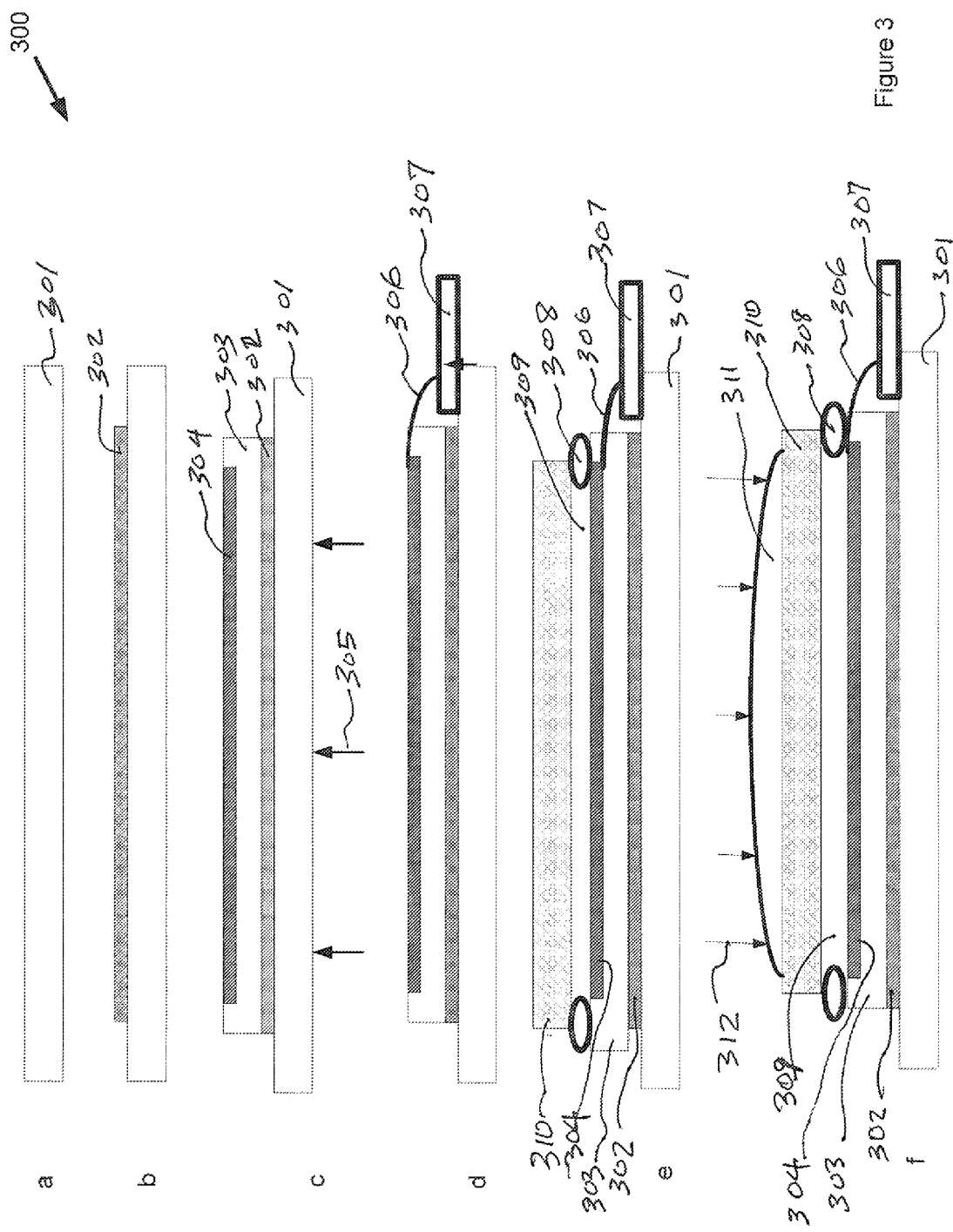
FIGS. 3a to f show one embodiment of a glass substrate based, ultra-violet adhesive curing process and using a dark fiber optic plate.

FIGS. 2a to f show one embodiment of a glass substrate based, ultra-violet adhesive curing process using a clear fiber optic plate. Radiological imaging sensor 200 comprises transparent glass substrate plate 201 having an upper side and a bottom side. As will be apparent to those skilled in the art, although a transparent glass substrate plate is referenced, other such crystalline transparent substrate plates may be used including, but not limited to, a sapphire substrate plate.

The term transparent as used herein with regard to the crystalline substrate plate refers to a property of allowing passage therethrough of radiation, including forms of radiation such as ultra-violet (UV) radiation and X-rays.

Imaging die 203 is disposed on top of first layer of ultra-violet curable adhesive 202. Imaging die 203 has an active image sensor region 204, which may be comprised of solid state sensor elements such as charge coupled device (CCD) or complementary metal oxide semiconductor (CMOS) elements. Active image sensor region 204 is located at a top surface of imaging die 203, and may be secured in place by first layer of ultra-violet curable adhesive 202 applied to the upper side of glass substrate plate 201. Ultraviolet rays 205 are applied from the underside of glass substrate plate 201 for curing of adhesive layer 202. The duration of the ultraviolet curing process is typically of the order of about 15 to 30 seconds, so the production time, throughput, and cost advantages, as compared with the much more time-consuming thermal curing process, are evident.

Any number of flexible cable connections 207 may be provided by forming wire bond 206 from the flexible cable to the imaging die. It is noted that wire bond 206 is provided directly onto the substrate of imaging die 103, so no special "post" for attachment is needed as in the Kovar-based substrate cases.

Clear fiber optic plate 208 is stacked on the top surface of imaging die 203, clear fiber optic plate 208 covering at least image sensor region 204. Clear fiber optic plate 208 is secured in place by second layer of ultra-violet curable adhesive 210 applied to the top surface of the imaging die. Ultraviolet rays 209 are applied through the top surface of clear fiber optic plate 208 for curing of adhesive layer 210, thus securing clear fiber optic plate 208 in place over imaging die 203.

Scintillator layer 211 is disposed on a top surface of the clear fiber optic plate. Scintillator layer 211 may be provided by deposition on the top surface of clear fiber optic plate 208, or alternatively as a paper strip of scintillator material. The paper scintillator strip may be secured onto radiological imaging sensor 200 using a press-on cover (not shown).

FIGS. 3a to f show one embodiment of a glass substrate based, ultra-violet adhesive curing process using a dark fiber optic plate. Radiological imaging sensor 300 comprises transparent glass substrate plate 301 having an upper side and a bottom side. In one further embodiment, transparent glass substrate plate 301 may be impregnated with one or more crystalline sapphire strip(s), to promote and enhance thermal transfer characteristics during the ultra-violet curing process.

Imaging die 303 is stacked on top of the glass plate substrate, the imaging die secured in place by a first layer of ultra-violet curable adhesive 302.

Imaging die 303 has active image sensor region 304 located at a top surface of the imaging die. Ultraviolet rays 305 may be applied from the bottom side of transparent glass substrate 301 to cure ultraviolet curable adhesive 302, similarly as described above.

Any number of flexible cable connections 307 may be provided by forming wire bond 306 from the flexible cable directly to imaging die 303.

Dark fiber optic plate 310 is stacked on the top surface of imaging die 103, the dark fiber optic plate being secured in place by support protrusions 308 applied around a perimeter of dark fiber optic plate 310. Support protrusions 308 may comprise a continuous application around the perimeter of dark fiber optic plate 310, or a discontinuous application at discrete locations around the perimeter of dark fiber optic plate 310, or any combination thereof. A second layer of ultra-violet curable adhesive 309 is applied between the top surface of the imaging die and a bottom surface of the dark fiber optic plate, and is also retained by support protrusions 308.

Dark fiber optic plate 310, as supplied, may include a coating of scintillator layer 311 disposed over at least the active image sensor region 304 of the imaging die 303. Although second layer of ultra-violet curable adhesive 309 is not specifically cured by application of ultraviolet rays, once deployed in practice, and exposed to x-rays, resulting scintillator emissions will provide the source of radiation to cure the second layer of ultra-violet curable adhesive 309, thus permanently securing dark fiber optic plate 310 with the coating of scintillator layer 311 in place.

Figure 4:
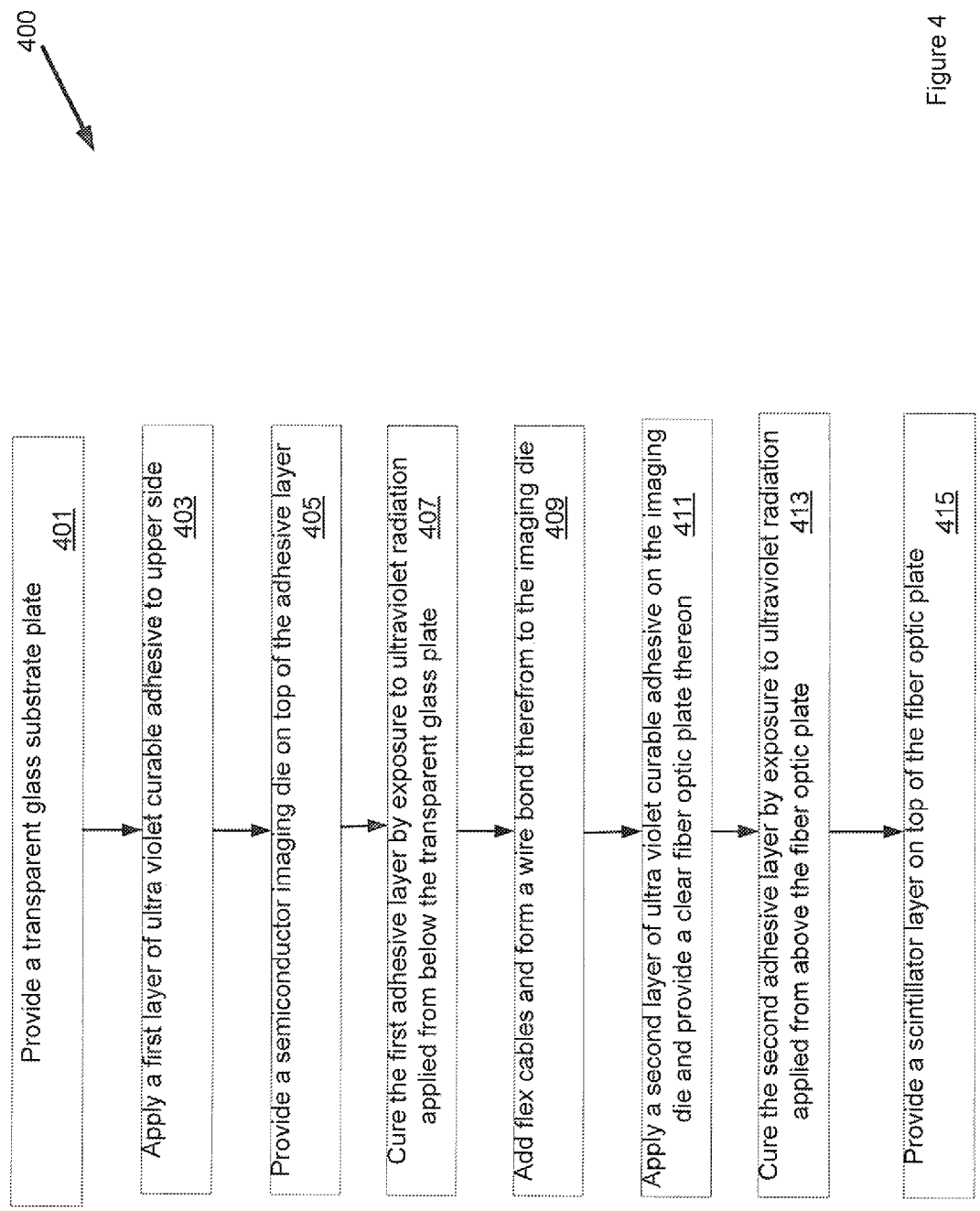
FIG. 4 is a flowchart illustrating one embodiment of the ultra-violet cured, glass substrate-based construction process using a clear fiber optic plate.

FIG. 4 is a flowchart illustrating one embodiment of the ultra-violet cured, glass substrate-based construction process using a clear fiber optic plate. A method of assembling a radiological imaging sensor is shown. At step 401, transparent glass substrate plate 201 having an upper side and a bottom side, is provided.

At step 403, a first layer of ultra-violet curable adhesive 202 is applied to the upper side of glass substrate plate 201.

At step 405, imaging die 203 on top of the first layer of ultra-violet curable adhesive 202, the imaging die having an active image sensor region 204 located at a top surface of the imaging die. The active sensor region may comprise either charge coupled device (CCD) or complementary metal oxide semiconductor (CMOS) sensors.

At step 407, the first layer of ultra-violet curable adhesive is cured by exposure to ultra-violet radiation 205, the ultra-violet radiation being applied through the bottom side of transparent glass substrate layer 201. In a further embodiment, to promote thermal transfer and enhance the ultra-violet curing characteristics, transparent glass substrate plate 301 may comprise one or more crystalline sapphire strip(s) inserted into apertures created therewithin.

At step 409, any desired number of flexible cable connections 207 may be provided by forming wire bond 206 from each flexible cable to imaging die 203.

At step 411, a second layer of ultra-violet curable adhesive is applied to the top surface of the imaging die, the second layer covering at least the active image sensor region, and a clear fiber optic plate is stacked on the top surface of the imaging die, the clear fiber optic plate covering at least the image sensor region.

At step 413, second layer of ultra-violet curable adhesive 210 is cured by exposure to ultra-violet radiation 209, ultra-violet radiation 209 applied through a top side of the stacked clear fiber optic plate.

At step 415, scintillator layer 211 is provided on a top surface of clear fiber optic plate 208. Scintillator layer 211 may be formed by deposition of scintillator material on the top surface of clear fiber optic plate 208. In another embodiment, the scintillator 211 may comprise a paper strip of scintillator material placed on the top surface of clear fiber optic plate 208, and secured thereon using a press-on cover. The press-on cover also functions to minimize or eliminate any resultant air gap between the scintillator strip and the fiber optic plate.

Figure 5:
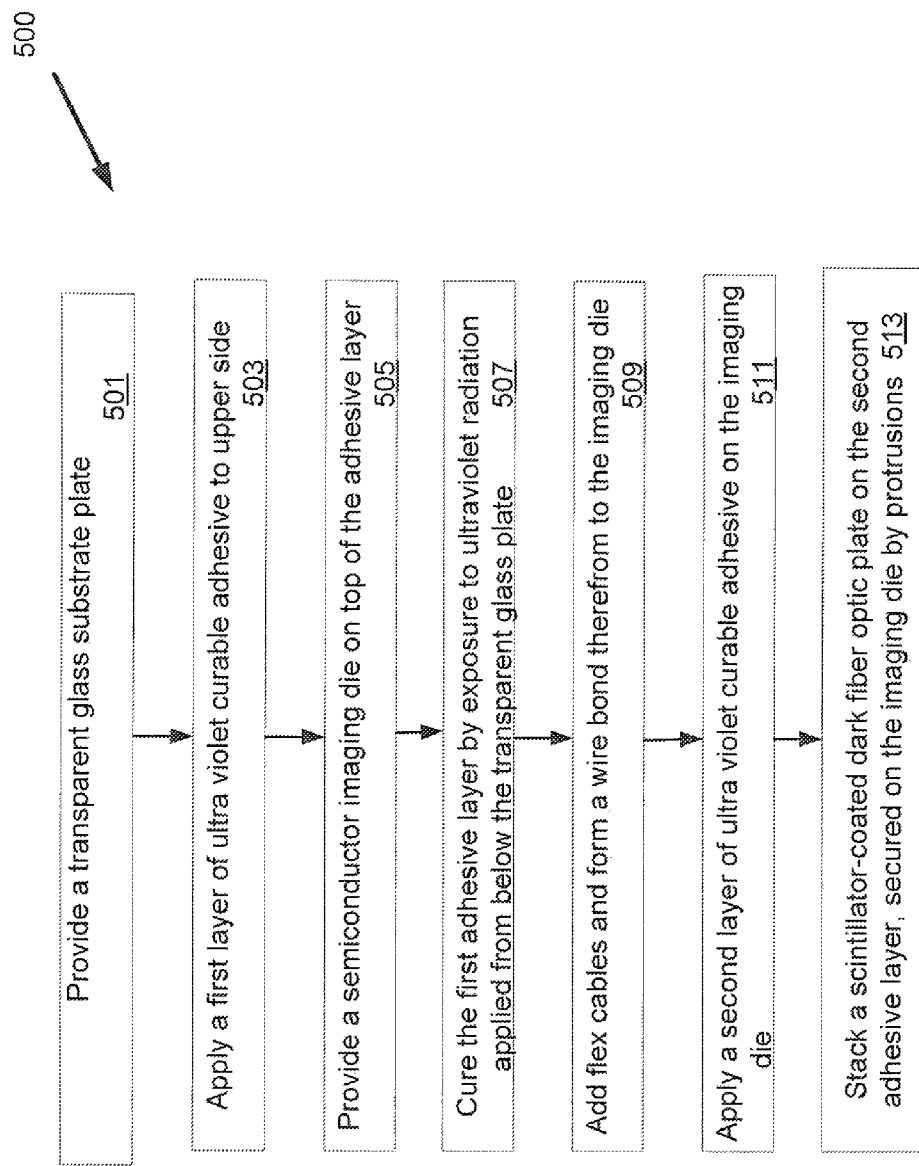
FIG. 5 is a flowchart illustrating one embodiment of the ultra-violet cured, glass substrate-based construction process using a dark fiber optic plate.

FIG. 5 is a flowchart illustrating one embodiment of the ultra-violet cured, glass substrate-based construction process using a dark fiber optic plate having a scintillator coating. At step 501, transparent glass substrate plate 301 having an upper side and a bottom side is provided.

At step 503, a first layer of ultra-violet curable adhesive 302 is applied to the upper side of glass substrate plate 301.

At step 505, imaging die 303 is provided on top of the first layer of ultra-violet curable adhesive 302, imaging die 303 having an active image sensor region 304 located at its top surface. Active sensor region 304 may comprise either charge coupled device (CCD) or complementary metal oxide semiconductor (CMOS) sensor elements or pixels.

At step 507, first layer of ultra-violet curable adhesive 302 is cured by exposure to ultra-violet radiation 305, ultra-violet radiation 305 being applied through the bottom side of transparent glass substrate 301.

At step 509, any number of flexible cable connections 307 may be provided by forming wire bond 306 from each flexible cable to imaging die 303.

At step 511, a second layer of ultra-violet curable adhesive 309 is applied to the top surface of the imaging die 303, the second layer 309 covering at least active image sensor region 304.

At step 513, dark fiber optic plate 310 having a coated scintillator layer 311 is stacked on the top surface of the imaging die 403, the scintillator coating layer 311 arranged distal, or facing away from, the imaging die, dark fiber optic plate 310 being secured in place by support protrusions 308 applied around a perimeter of dark fiber optic plate 310. Again, support protrusions 308 may comprise a continuous application around the perimeter of dark fiber optic plate 310, or a discontinuous application at discrete locations around the perimeter of dark fiber optic plate 310, or any combination thereof.

It is contemplated that once deployed in usage in x-ray radiological imaging as intended, where scintillator layer 311 will be exposed to incident x-rays, scintillator emissions will act to cure second layer of ultra-violet curable adhesive 309, thereby permanently bonding dark fiber optic plate 310 onto imaging die 303.

Although preferred embodiments of the invention have been described herein with regard to x-ray imaging sensors, it is contemplated, and indeed it will be understood by those skilled in the art, that the solutions presented herein may be applied to other types of radiological imaging sensors. Accordingly, a person of ordinary skill in the art will understand that the specific embodiments described herein, while illustrative may not necessarily be comprehensive, and various modifications may be made without departing from the scope of the invention as defined by the claims.

What is claimed is:

1. A method of assembling a radiological imaging sensor comprising:
    providing a transparent crystalline substrate plate having an upper side and a bottom side;
    applying a first layer of ultra-violet curable adhesive to the upper side of the crystalline substrate plate;
    placing an imaging die on top of the first layer of ultra-violet curable adhesive, the imaging die having an active image sensor region located at a top surface of the imaging die;
    curing the first layer of ultra-violet curable adhesive by exposure to ultra-violet radiation, the ultra-violet radiation applied through the bottom side of the transparent crystalline substrate plate;
    providing at least one flexible cable connection by forming a wire bond from the flexible cable to the imaging die;
    applying a second layer of ultra-violet curable adhesive to the top surface of the imaging die, the second layer covering at least the active image sensor region;
    stacking a clear fiber optic plate on the top surface of the imaging die, the clear fiber optic plate covering at least the image sensor region;

curing the second layer of ultra-violet curable adhesive by exposure to ultra-violet radiation, the ultra-violet radiation applied through a top side of the stacked clear fiber optic plate; and providing a scintillator layer on a top surface of the clear fiber optic plate.

2. The method of claim 1 wherein the scintillator layer is provided by deposition on the top surface of the clear fiber optic plate.

3. The method of claim 1 wherein the scintillator layer comprises a paper strip of scintillator material.

4. The method of claim 3 further comprising securing the paper scintillator strip onto the radiological imaging sensor by attaching a press-on cover.

5. The method of claim 1 wherein the transparent crystalline substrate plate is one of a glass substrate plate and a sapphire substrate plate.

6. The method of claim 1 wherein the imaging die consists of one of a complementary metal oxide semiconductor (CMOS) and a charge couple device (CCD) imaging sensor.

7. The method of claim 1 wherein the transparent crystalline substrate plate comprises a glass substrate plate, the glass substrate plate further including at least one crystalline sapphire strip disposed in an aperture therewithin.

8. A method of assembling a radiological imaging sensor comprising:

providing a transparent crystalline substrate plate having an upper side and a bottom side;

applying a first layer of ultra-violet curable adhesive to the upper side of the crystalline substrate plate;

placing an imaging die on top of the first layer of ultra-violet curable adhesive, the imaging die having an active image sensor region located at a top surface of the imaging die;

curing the first layer of ultra-violet curable adhesive by exposure to ultra-violet radiation, the ultra-violet radiation applied through the bottom side of the transparent crystalline substrate plate;

providing at least one flexible cable connection by forming a wire bond from the flexible cable to the imaging die;

applying a second layer of ultra-violet curable adhesive to the top surface of the imaging die, the second layer covering at least the active image sensor region; and stacking a dark fiber optic plate on the top surface of the imaging die, the dark fiber optic plate having a coating of scintillator material on a surface distal the imaging die, the dark fiber optic plate further being secured in place by support protrusions applied around a perimeter of the dark fiber optic plate.

9. The method of claim 8 further comprising exposing the scintillator layer to incident x-rays, wherein scintilator emissions cure the second layer of ultra-violet curable adhesive, thereby bonding the dark fiber optic plate onto the imaging die.

10. The method of claim 8 wherein the transparent crystalline substrate plate comprises a transparent glass substrate plate, the transparent glass plate further including at least one crystalline sapphire strip disposed in an aperture therewithin.

11. The method of claim 1 wherein the imaging die consists of one of a complementary metal oxide semiconductor (CMOS) and a charge couple device (CCD) imaging sensor.

12. A radiological imaging sensor comprising:

a transparent crystalline substrate plate having an upper side and a bottom side;

an imaging die disposed on top of the first layer of ultra-violet curable adhesive, the imaging die having an active image sensor region located at a top surface of the imaging die, the imaging die secured in place by a first layer of ultra-violet curable adhesive applied to the upper side of the crystalline substrate plate;

at least one flexible cable connection provided by forming a wire bond from the flexible cable to the imaging die;

a clear fiber optic plate stacked on the top surface of the imaging die, the clear fiber optic plate covering at least the image sensor region, the clear fiber optic plate secured in place by a second layer of ultra-violet curable adhesive applied to the top surface of the imaging die; and a scintillator layer disposed on a top surface of the clear fiber optic plate.

13. The radiological imaging sensor of claim 12 wherein the scintillator layer is provided by deposition on the top surface of the clear fiber optic plate.

14. The radiological imaging sensor of claim 12 wherein the scintillator layer comprises a paper strip of scintillator material.

15. The radiological imaging sensor of claim 14 further comprising securing the paper scintillator strip onto the radiological imaging sensor using a press-on cover.

16. The radiological imaging sensor of claim 12 wherein the transparent crystalline substrate plate is one of a glass substrate plate and a sapphire substrate plate.

17. The radiological imaging sensor of claim 12 wherein the imaging die is one of a complementary metal oxide semiconductor (CMOS) and a charge coupled device (CCD) imaging sensor.

18. A radiological imaging sensor comprising:

a transparent glass substrate plate having an upper side and a bottom side;

an imaging die stacked on top of the glass plate substrate, the imaging die secured in place by a first layer of ultra-violet curable adhesive, the imaging die having an active image sensor region located at a top surface of the imaging die;

at least one flexible cable connection provided by forming a wire bond from the flexible cable to the imaging die;

a dark fiber optic plate stacked on the top surface of the imaging die, the dark fiber optic plate being secured in place by support protrusions applied around a perimeter of the dark fiber optic plate;

a second layer of ultra-violet curable adhesive applied between the top surface of the imaging die and a bottom surface of the dark fiber optic plate; and a scintillator layer deposited on a top surface of the dark fiber optic plate, the scintillator layer disposed over at least the active image sensor region of the imaging die.

19. The radiological imaging sensor of claim 18 wherein the imaging die consists of one of a charge couple device (CCD) imaging sensor and a complementary metal oxide semiconductor (CMOS) imaging sensor.

20. The radiological imaging sensor of claim 18 wherein the glass substrate plate further includes at least one crystalline sapphire strip disposed in an aperture therewithin.

* * * * *